US011400556B2

(12) United States Patent
Takasu et al.

(10) Patent No.: US 11,400,556 B2
(45) Date of Patent: Aug. 2, 2022

(54) ABNORMALITY DETECTION APPARATUS FOR WORKING TOOLS

(71) Applicant: JTEKT CORPORATION, Osaka (JP)

(72) Inventors: Shuntaro Takasu, Hekinan (JP); Yuki Ishigure, Gifu (JP); Hisashi Otani, Anjo (JP); Toshihiro Yonezu, Nishio (JP)

(73) Assignee: JTEKT CORPORATION, Osaka (JP)

( * ) Notice: Subject to any disclaimer, the term of this patent is extended or adjusted under 35 U.S.C. 154(b) by 139 days.

(21) Appl. No.: 16/892,345

(22) Filed: Jun. 4, 2020

(65) Prior Publication Data
US 2020/0398398 A1    Dec. 24, 2020

(30) Foreign Application Priority Data

Jun. 18, 2019  (JP) .............................. JP2019-113130

(51) Int. Cl.
*B23Q 17/09*    (2006.01)
*G06N 20/00*    (2019.01)

(52) U.S. Cl.
CPC ......... *B23Q 17/0957* (2013.01); *G06N 20/00* (2019.01)

(58) Field of Classification Search
CPC .......................... B23Q 17/0957; G06N 20/00
USPC ................................................. 700/173–189
See application file for complete search history.

(56) References Cited

U.S. PATENT DOCUMENTS

| 5,142,210 A * | 8/1992 | Kojima ............... G05B 19/4062 |
| | | 318/275 |
| 5,715,388 A * | 2/1998 | Tsuchihashi .......... G06F 11/321 |
| | | 714/46 |
| 10,359,356 B2 * | 7/2019 | Kumazaki .............. G01N 19/08 |
| 2019/0210176 A1 * | 7/2019 | Yamamoto ......... G05B 13/0265 |
| 2020/0088604 A1 * | 3/2020 | Schroeder .......... G05B 19/4065 |
| 2020/0278659 A1 * | 9/2020 | Liu ....................... G05B 19/409 |
| 2021/0031384 A1 * | 2/2021 | Hirose ............... G05B 23/0235 |
| 2021/0356934 A1 * | 11/2021 | Krishna ............. G05B 19/4065 |

FOREIGN PATENT DOCUMENTS

| JP | 55-048557 A | 4/1980 |
| JP | 58-056754 A | 4/1983 |
| JP | 6426667 B2 | 11/2018 |

OTHER PUBLICATIONS

Fujishima, Makoto, et al. "Utilisation of IoT and sensing for machine tools." Journal of Machine Engineering 19 (2019).pp.38-47 (Year: 2019).*

(Continued)

*Primary Examiner* — Satish Rampuria
(74) *Attorney, Agent, or Firm* — Oblon, McClelland, Maier & Neustadt, L.L.P.

(57) ABSTRACT

An abnormality detection apparatus for working tools configured to be used in a machining process performed by a machine tool, the abnormality detection apparatus includes a storage portion which previously stores correlations between features of a plurality of operating portions relation to the machining process performed by the machine tool, and a tool condition of each of a plurality of working tool types, and a tool condition determining portion which determines the tool condition of the working tools based on the correlations.

11 Claims, 5 Drawing Sheets

(56) References Cited

OTHER PUBLICATIONS

Fujishima, Makoto, et al. "Development of sensing interface for preventive maintenance of machine tools." Procedia CIRP 61 (2017): pp. 796-799. (Year: 2017).*
Deng, Changyi, et al. "Data cleansing for energy-saving: a case of cyber-physical machine tools health monitoring system." International Journal of Production Research 56.1-2 (2018): pp. 1000-1015. (Year: 2018).*
Singh, Satnam, et al. "Anomaly detection via feature-aided tracking and hidden Markov models." IEEE Transactions on Systems, Man, and Cybernetics—Part A: Systems and Humans 39.1 (2008): pp. 144-159. (Year: 2008).*
Chen, Jihong, et al. "CPS modeling of CNC machine tool work processes using an instruction-domain based approach." Engineering 1.2 (2015): pp. 247-260. (Year: 2015).*
Boryczko, Adam. "Profile irregularities of turned surfaces as a result of machine tool interactions." Metrology and Measurement Systems 18.4 (2011): pp. 691-699. (Year: 2011).*

* cited by examiner

| KIND OF DATA | | | TOOL CONDITION | TOOL TYPE | | | |
|---|---|---|---|---|---|---|---|
| | | | | DRILL | | SKIVING | |
| OPERATING PORTION | FEATURE | | | ABRA-SION | CHIP-PING | ABRA-SION | CHIP-PING |
| MAIN SPINDLE | SPEED | MEAN VALUE | | ○ | △ | ○ | ○ |
| | | DISPERSION VALUE | | △ | △ | ○ | ○ |
| | POSITION DEVIATION | MEAN VALUE | | △ | △ | ◎ | ◎ |
| | | DISPERSION VALUE | | △ | △ | ○ | ○ |
| | TORQUE | MEAN VALUE | | ◎ | ◎ | ◎ | ○ |
| | | MAXIMUM VALUE | | △ | △ | ◎ | ◎ |
| | VIBRATION | PEAK VALUE OF CUTTING FREQUENCY | | ◎ | ◎ | ◎ | ◎ |
| X-AXIS SPINDLE | SPEED | MEAN VALUE | | △ | ○ | ○ | ◎ |
| | | DISPERSION VALUE | | △ | △ | △ | △ |
| | POSITION DEVIATION | MEAN VALUE | | △ | △ | ○ | ◎ |
| | | DISPERSION VALUE | | △ | △ | △ | △ |
| | TORQUE | MEAN VALUE | | △ | △ | ◎ | ◎ |
| | | MAXIMUM VALUE | | △ | △ | △ | △ |
| Y-AXIS SPINDLE | SPEED | MEAN VALUE | | △ | ○ | ○ | ◎ |
| | | DISPERSION VALUE | | △ | △ | △ | △ |
| | POSITION DEVIATION | MEAN VALUE | | △ | ◎ | ○ | ◎ |
| | | DISPERSION VALUE | | △ | △ | △ | △ |
| | TORQUE | MEAN VALUE | | △ | △ | ◎ | ◎ |
| | | MAXIMUM VALUE | | △ | △ | ◎ | ◎ |
| Z-AXIS SPINDLE | SPEED | MEAN VALUE | | ○ | ◎ | ○ | ◎ |
| | | DISPERSION VALUE | | ○ | ○ | △ | △ |
| | POSITION DEVIATION | MEAN VALUE | | ○ | ◎ | ○ | ◎ |
| | | DISPERSION VALUE | | ○ | ○ | △ | △ |
| | TORQUE | MEAN VALUE | | ◎ | ◎ | ◎ | ◎ |
| | | MAXIMUM VALUE | | ◎ | ◎ | ◎ | ◎ |
| WORKPIECE SPINDLE | SPEED | MEAN VALUE | | | | ○ | ◎ |
| | | DISPERSION VALUE | | | | ○ | ○ |
| | POSITION DEVIATION | MEAN VALUE | | | | ○ | ◎ |
| | | DISPERSION VALUE | | | | ○ | ○ |
| | TORQUE | MEAN VALUE | | | | ◎ | ◎ |
| | | MAXIMUM VALUE | | | | ◎ | ◎ |

PRIORITY: H ◎ ○ △ ✕ L

ABNORMALITY DETECTION APPARATUS FOR WORKING TOOLS

CROSS REFERENCE TO RELATED APPLICATIONS

This application claims priority from Japanese Patent Application No. 2019-113130 filed on Jun. 18, 2019, the entire contents of which are incorporated herein by reference.

BACKGROUND OF THE INVENTION

Field of the Invention

The present invention relates to an abnormality detection apparatus for working tools.

Description of Related Art

Conventionally, the conditions of working tools are uniformly evaluated based on the number of machined workpieces and the machining time period, and the presence of an abnormality is then detected. However, it is requested to develop an apparatus that can detect an abnormality for each of working tool types. An apparatus for collecting a plurality of measurement data relating to working tools from a machine tool, and then detecting an abnormality of the working tool based on the collected measurement data, an apparatus for measuring the position of working tools in a machine tool, and detecting an abnormality of the working tool based on the measured position, and an apparatus for measuring the distance with respect to working tools in a machine tool, and detecting an abnormality of the working tool based on the measured distance are known.
[Patent Literature 1] JP-B-6426667
[Patent Literature 2] JP-A-55-48557
[Patent Literature 3] JP-A-58-56754

According to a related art, in a case where a number of items of measurement data to be collected is large, a capacity of a memory for storing the measurement data is increased, and time periods of analyzing and processing the measurement data are prolonged. Moreover, a sample period of the measurement data is lengthened, and therefore an accuracy of the measurement data tends to be lowered. A process of detecting an abnormality of working tools based on a position or distance of the working tool tends to become cumbersome.

SUMMARY

One or more embodiments provide an abnormality detection apparatus for working tools that can detect an abnormality of working tools for each working tool type while collecting minimum necessary measurement data.

In accordance with one or more embodiments, an abnormality detection apparatus for working tools configured to be used in a machining process performed by a machine tool, the abnormality detection apparatus includes a storage portion which previously stores correlations between features of a plurality of operating portions relation to the machining process performed by the machine tool, and a tool condition of each of a plurality of working tool types, and a tool condition determining portion which determines the tool condition of the working tools based on the correlations.

Accordance to one or more embodiments, a tool condition of each of a plurality of working tool types are associated with features of a plurality of operating portions. In the case where an abnormality of working tools of a predetermined tool type is to be determined, therefore, it is required only to measure features that are most effective in the tool type. Consequently, the number of items of measurement data to be collected can be reduced, the capacity of a memory for storing the collected measurement data can be prevented from being increased, and time periods of analyzing and processing the measurement data can be shortened. Moreover, the sample period of the measurement data is shortened, and therefore the accuracy of the measurement data can be enhanced.

DETAILED DESCRIPTION (1. Configuration of Abnormality Detection Apparatus for Working Tool)

An abnormality detection apparatus for working tools of an embodiment of the invention previously sets items of features that are necessary to be acquired for each of tool types of working tools, and that will be described later in detail, in the form of a map, collects and analyzes only measurement data of features that are effective in the tool type of working tools, and detects an abnormality of the working tool is detected.

Therefore, the number of items of measurement data to be collected can be reduced, the capacity of a memory for storing the measurement data can be prevented from being increased, and time periods of analyzing and processing the measurement data can be shortened. Moreover, the sample period of the measurement data is shortened, and therefore the accuracy of the measurement data can be enhanced.

Figure 1:
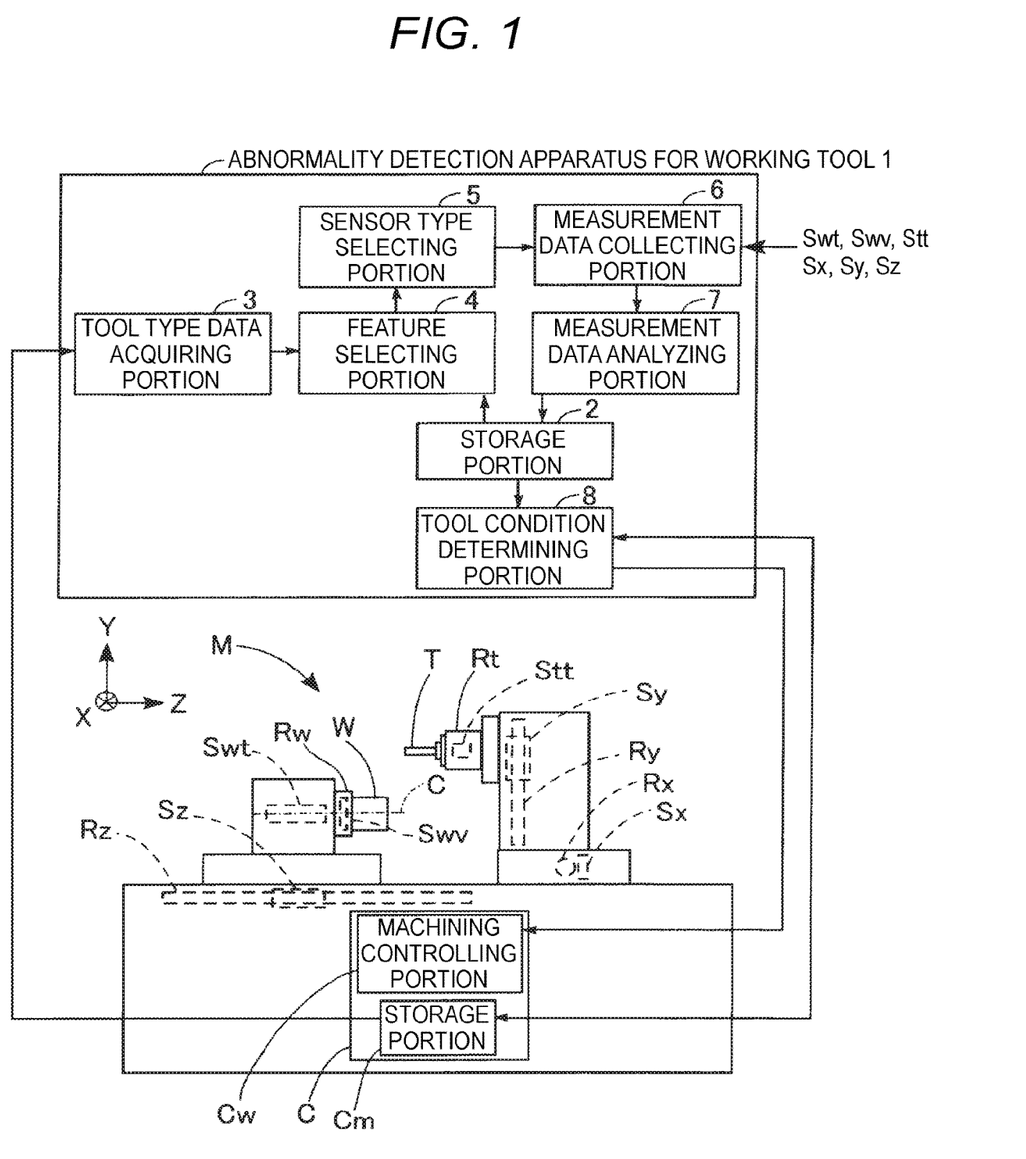
FIG. 1 is a diagram showing the whole configurations of an abnormality detection apparatus for working tools of an embodiment, and a machine tool.

With reference to FIG. 1, the configuration of an abnormality detection apparatus 1 for working tools that is to be used in a machining process performed by a machine tool M which is, for example, a usual four-axis machining center will be described. The machine tool M has, as drive spindles, three rectilinear spindles (the X-, Y-, and Z-axis spindles) orthogonal to one another, and one rotation spindle (the C-axis spindle that is parallel to the Z axis).

That is, the machine tool M is configured so that, in a state where a working tool T is supported at the tip end of the main spindle Rt (operating portion), the working tool T is rotatable about the axis of the main spindle Rt, and movable in the X-axis direction along the X-axis spindle Rx (operating portion) and in the Y-axis direction along the Y-axis spindle Ry (operating portion). The machine tool is further configured so that, in a state where a workpiece W is held by the workpiece spindle Rw (operating portion), the workpiece is rotatable about the C axis, and movable in the Z-axis direction along the Z-axis spindle Rz (operating portion).

The abnormality detection apparatus 1 for working tools includes a storage portion 2, a tool type data acquiring portion 3, a feature selecting portion 4, a sensor type selecting portion 5, a measurement data collecting portion 6, a measurement data analyzing portion 7, a tool condition determining portion 8, etc. Here, the portions 2 to 8 constituting the abnormality detection apparatus 1 may be configured by individual hardware components, or realized by software.

Figure 3:
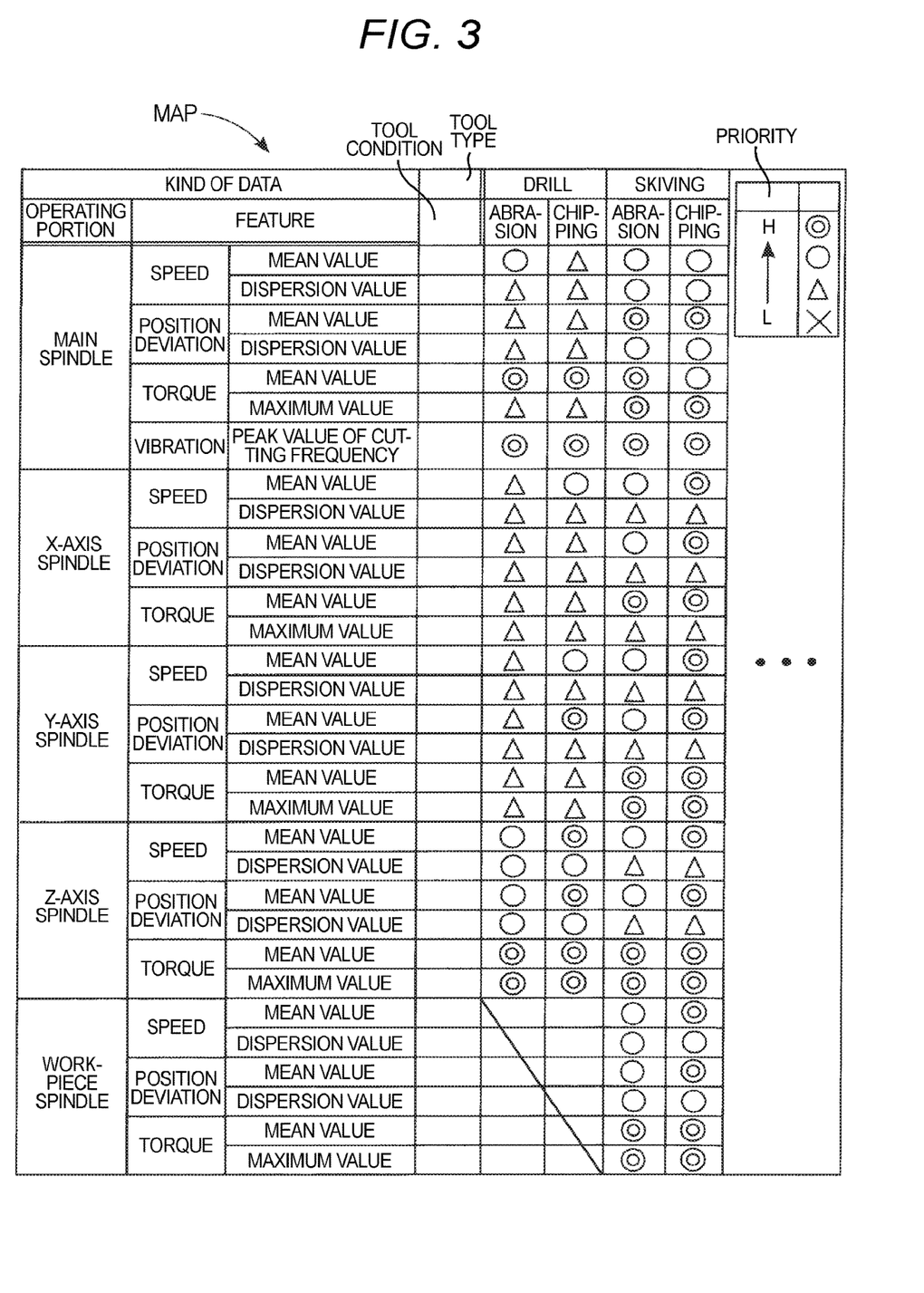
FIG. 3 is a view showing an example of a map that is stored in the abnormality detection apparatus.

The storage portion 2 previously stores the above-described map, and further stores analysis data that will be described later, and the like. As shown in FIG. 3, the map MAP indicates correlations between features of a plurality of operating portions that relate to machining in the machine tool M, i.e., the plurality of drive spindles in the machine tool M, and a working tool condition of respective tool types.

That is, the map MAP indicates features of the drive spindles that, when a machining process is performed by using a certain working tool T, function as indexes in determination of the working tool condition of the working tool T, and indicates the features for each tool type. The map MAP is prepared by the worker as a result of actually performing various test processes.

In the machine tool M of the embodiment, specifically, the operating portions are the main spindle Rt, the X-axis spindle Rx, the Y-axis spindle Ry, the Z-axis spindle Rz, and the workpiece spindle Rw, and features of the spindles Rt, Rx, Ry, Rz, and Rw are, for example, the mean and dispersion values of speeds, those of position deviations, and the mean and maximum values of torques. The peak value of vibrations is added as an option to the features of the main spindle Rt. These features are mere examples, and may be values of other items.

The plurality of tool types are, for example, a drill and a skiving. Although not illustrated, other examples are an end mill, a milling machine, a tapping machine, a reaming machine, a boring machine, etc. The tool condition is abrasion of the edge of the working tool T, and chipping of the edge of the working tool T. The correlation between the feature and the tool condition is indicated by the priority in selection of the features (the priority is lower in the order of ⊙, ○, Δ, and x). Alternatively, the priority may be indicated by a correlation coefficient.

The tool type data acquiring portion 3 acquires the tool type that is to be used in a machining process, based on a tool number that is written in an NC program for controlling the machining process. The NC program is stored in a storage portion Cm of a controller C of the machine tool M. Specifically, the tool type data acquiring portion 3 acquires, for example, a drill. Hereinafter, a case where a drill is used as the working tool T will be exemplarily described.

The feature selecting portion 4 refers to the map MAP stored in the storage portion 2, and selects features that are effective in determination of the tool condition of the tool type which is acquired by the tool type data acquiring portion 3. Specifically, the feature selecting portion 4 selects, as features that have high priority with respect to a drill, for example, features of ⊙, the mean and maximum values of torques of the main spindle Rt, the peak value of the cutting frequency of vibrations of the main spindle Rt, the means value of position deviations of the X-axis spindle Rx, the means value of position deviations of the Y-axis spindle Ry, the means values of speeds of the Z-axis spindle Rz, the means value of position deviations of the Z-axis spindle Rz, and the mean and maximum values of torques of the Z-axis spindle Rz, from the map MAP.

The sensor type selecting portion 5 selects sensors for obtaining measurement data of the features that are selected by the feature selecting portion 4. This allows only necessary sensors to be selected. Therefore, the number of items of measurement data to be collected can be reduced, the capacity of a memory for storing the measurement data can be prevented from being increased, and time periods of analyzing and processing the measurement data can be shortened.

Specifically, the sensor type selecting portion 5 selects torque sensors Stt, Szt that measure the torques of the main spindle Rt and the Z-axis spindle Rz, respectively, a vibration sensor Szv that measures vibrations of the main spindle Rt, and position sensors Spx, Spy, Spz that measure the positions of the X-axis spindle Rx, the Y-axis spindle Ry, and the Z-axis spindle Rz, respectively.

Figure 4:
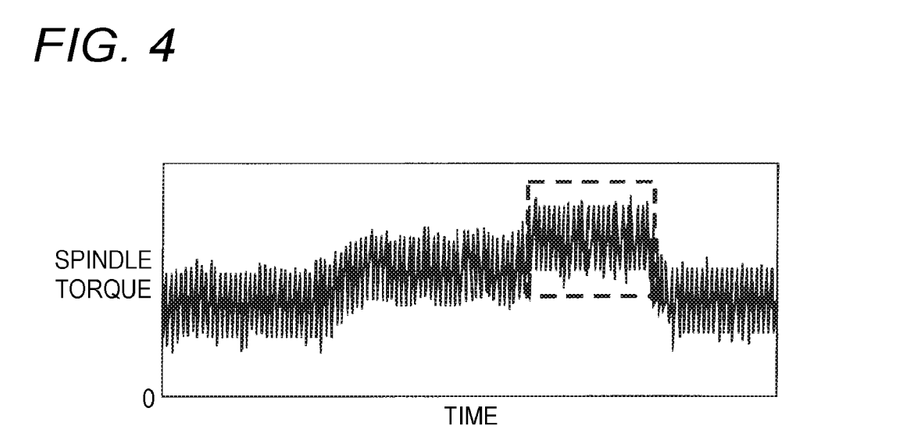
FIG. 4 is view showing an example of measurement data contained in the map, and a temporal change of the torque of the main spindle during machining.

The measurement data collecting portion 6 collects measurement data during a machining process from the sensors that are selected by the sensor type selecting portion 5. Specifically, the measurement data collecting portion 6 receives a measurement signal of the torque of the main spindle Rt from the torque sensor Stt, segments a state where the machining process is stabilized, i.e., the predetermined area enclosed by the broken-line rectangle as shown in FIG. 4, and collects the torques as measurement data of the torque of the main spindle Rt.

Similarly, the measurement data collecting portion 6 receives a measurement signal of vibrations of the main spindle Rt from the vibration sensor Szv, and collects data in a state where the machining process is stabilized, as measurement data of vibrations of the main spindle Rt, and further receives a measurement signal of the torque of the Z-axis spindle Rz from the torque sensor Szt, and collects data in a state where the machining process is stabilized, as measurement data of the torque of the Z-axis spindle Rz. The measurement data collecting portion 6 further receives measurement signals of the positions of the X-axis spindle Rx, the Y-axis spindle Ry, and the Z-axis spindle Rz from the position sensors Spx, Spy, Spz, and collects data in a state where the machining process is stabilized, as measurement data of the positions of the X-axis spindle Rx, the Y-axis spindle Ry, and the Z-axis spindle Rz.

The measurement data analyzing portion 7 analyzes the measurement data that are collected by the measurement data collecting portion 6. Specifically, the measurement data analyzing portion 7 analyzes the measurement data of the torque of the main spindle Rt that are collected from the torque sensor Stt, and calculates the mean and maximum values of the torque of the main spindle Rt, and analyzes the measurement data of the torque of the Z-axis spindle Rz that are collected from the torque sensor Szt, and calculates the mean and maximum values of the torque of the Z-axis spindle Rz.

The measurement data analyzing portion 7 further analyzes the measurement data of vibrations of the main spindle Rt that are collected from the vibration sensor Szv, and calculates the peak value of the cutting frequency of vibrations of the main spindle Rt. The measurement data analyzing portion 7 further analyzes the measurement data of the positions of the X-axis spindle Rx, the Y-axis spindle Ry, and the Z-axis spindle Rz that are collected from the position sensors Spx, Spy, Spz, and calculates the mean and dispersion values of the positions of the X-axis spindle Rx, the Y-axis spindle Ry, and the Z-axis spindle Rz. Then, the measurement data analyzing portion 7 causes the calculated analysis data to be stored and accumulated in the storage portion 2.

The tool condition determining portion 8 is configured to generate a determination model for each working tool type based on the analysis data that are analyzed by the measurement data analyzing portion 7, and then determines the tool condition of the working tool T based on the determination model. Therefore, the tool condition of the working tool T can be uniformly determined, and hence the machining accuracy of the workpiece can be enhanced.

Figure 5:
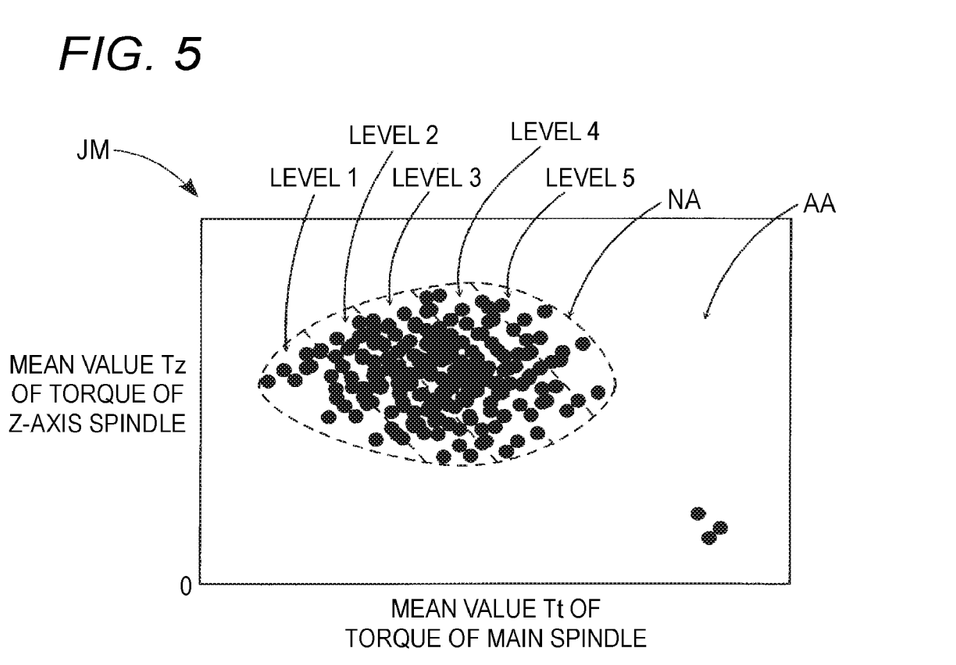
FIG. 5 is a view showing an example of a determination model that is stored in a determination model storage portion of the machine tool, and relationships between the mean value of the torque of a Z-axis spindle, and that of the torque of the main spindle.

In the determination model, for example, features of two kinds are plotted on the ordinate and abscissa of a two-dimensional graph, respectively, the point where the values of the analysis data of the features of the two kinds intersect with each other is plotted on the graph, and an area where the working tool T is normal, and that where the working tool T is abnormal are defined in the graph. The normal area in the graph is divided by the level of abrasion of the edge of the working tool T. Alternatively, a determination model in which features of three or more kinds are indicated in a multidimensional graph may be employed.

As shown in FIG. 5, specifically, the tool condition determining portion 8 is configured to generate a two-dimensional graph in which the mean value Tz of the torque of the Z-axis spindle Rz is plotted on the ordinate, and the mean value Tt of the torque of the main spindle Rt is plotted on the abscissa. Then, the mean value Tz of the torque of the Z-axis spindle Rz, and the mean value Tt of the torque of the main spindle Rt are read out from the analysis data accumulated in the storage portion 2, and the point where the mean value Tz of the torque of the Z-axis spindle Rz, and the mean value Tt of the torque of the main spindle Rt intersect with each other is plotted on the graph.

In a machining process in which the interportion of the mean value Tz of the torque of the Z-axis spindle Rz, and the mean value Tt of the torque of the main spindle Rt is plotted on the graph, on the other hand, the worker determines whether the edge of the drill is abraded or chipped, i.e., whether the drill is normal or abnormal. If the edge of the drill is abraded, moreover, the worker evaluates the degree of the abrasion, for example, at five Levels 1 to 5 (the amount of abrasion is larges at Level 5), i.e., the worker performs abrasion evaluation. Correspondingly with the above-described machining process, the determination result of normal/abnormal, and the result of the abrasion evaluation are stored and accumulated in the storage portion 2.

Based on the determination results of normal/abnormal that are accumulated in the storage portion 2, then, the tool condition determining portion 8 defines, in the graph, a normal area (the area enclosed by the broken-line circle in FIG. 5)) NA where abrasion of the edge of the drill occurs, and an abnormal area (outside the normal area (outside the area enclosed by the broken-line circle in the figure)) AA where chipping of the edge of the drill occurs.

Based on the abrasion evaluation results that are accumulated in the storage portion 2, the tool condition determining portion 8 further defines, in the normal area NA, areas of degrees of the abrasion of the edge of the drill, for example, areas of Levels 1 to 5 (the areas that are divided by the broken straight lines in FIG. 5). Then, a determination model JM that is generated by the above-described operations is stored in the storage portion Cm of the controller C of the machine tool M. As a result, the machine tool M has the determination model JM corresponding to the machine tool itself, and therefore the machining accuracy of the workpiece W can be enhanced.

Then, the tool condition determining portion 8 refers to the determination model stored in the storage portion Cm of the controller C of the machine tool M. If the mean value Tz of the torque of the Z-axis spindle Rz, and mean value Tt of the torque of the main spindle R that are obtained in machining of the drill are inside the normal area NA, the drill is normal, and therefore the level of abrasion of the edge of the drill is determined. By contrast, if the mean values are outside the normal area NA (in the abnormal area AA), it is determined that the drill is abnormal (chipping occurs in the edge).

This allows the working tool T to be used until the lifetime is exhausted. Therefore, the number of tool setups can be reduced, and the tool cost can be lowered. Moreover, it is possible to detect an abnormality (chipping) of a tool that cannot be found from the appearance of the tool, and therefore the number of processes of machining a workpiece W in which the machining accuracy is low can be reduced. Furthermore, inspection of the working tool T is not necessary.

Alternatively, the tool condition determining portion 8 may generate the determination model JM by machine learning. With respect to the determination model JM that has been already generated, for example, analysis data of features that are collected and analyzed in actual machining processes performed by the machine tool M are accumulated, and the existing determination model JM is updated. Therefore, it is possible to use the determination model JM of the latest condition, and the machining accuracy of the workpiece W can be enhanced.

Moreover, the determination model JM may be generated by re-learning. In the case where it is determined that the level of abrasion is high, or that abnormality occurs, but actually the working tool T is in a condition where it can be further used, for example, the existing determination model JM is updated by using correlations between the operating time of the working tool T and the level of abrasion or abnormality, as teacher data. This enables the detection accuracy of an abnormality of a tool to be further enhanced.

(2. Operation of Abnormality Detection Apparatus for Working Tool)

Next, the operation of the abnormality detection apparatus 1 for the working tool T will be described with reference to the flowcharts of FIGS. 2A and 2B. Here, it is assumed that the map MAP is previously generated and stored in the storage portion 2, and the tool condition determining portion 8 has not yet generated the determination model JM. It is further assumed that the worker causes the determination result of normal/abnormal of the working tool T, and the result of the abrasion evaluation, to be stored in the storage portion 2 for each machining process.

Figure 2A:
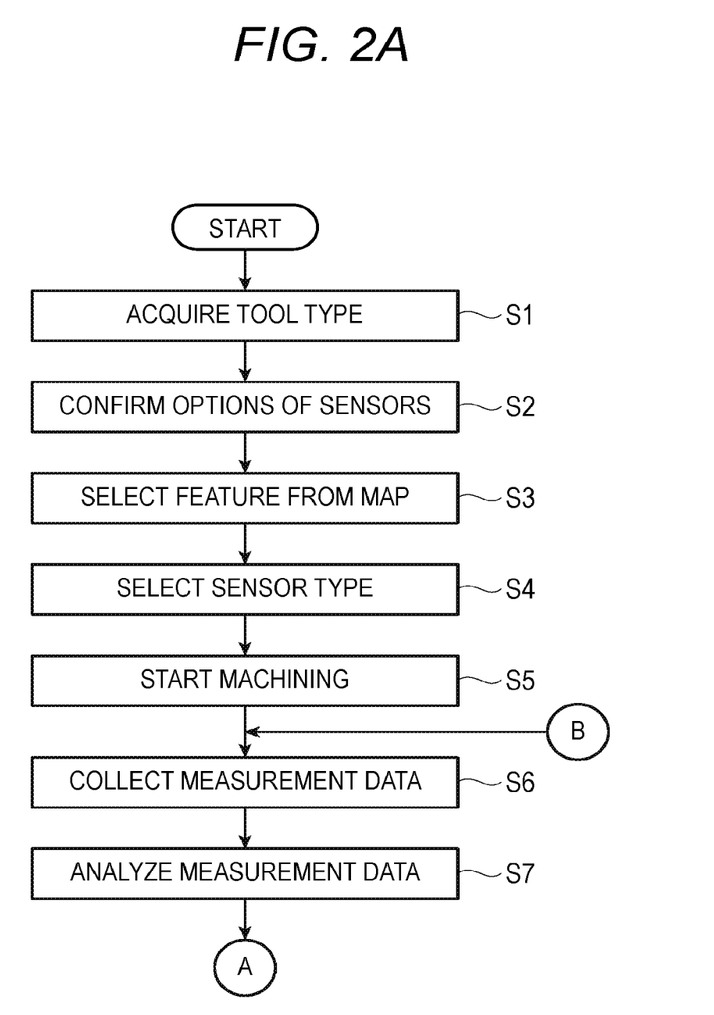
FIG. 2A is a flowchart illustrating the first half of the operation of the abnormality detection apparatus.

The tool type data acquiring portion 3 refers to the NC program stored in the storage portion Cm of the controller C of the machine tool M, and acquires the tool type corresponding to a tool number that is written in the NC program (step S1 in FIG. 2A). Then, the feature selecting portion 4 confirms options of the sensors for measuring features of the tool type that are acquired by the tool type data acquiring portion 3 (step S2 in FIG. 2A). For example, it is confirmed that, in measurement of the feature of the drill, the vibration sensor Szv that measures vibrations of the main spindle Rt is necessary.

Then, the feature selecting portion 4 refers to the map MAP stored in the storage portion 2, and selects the feature that corresponds to the tool type acquired by the tool type data acquiring portion 3, and that has the highest priority (step S3 in FIG. 2A). The sensor type selecting portion 5 selects sensors for obtaining the measurement data of the features that are selected by the feature selecting portion 4 (step S4 in FIG. 2A). Then, a machining controlling portion Cw of the controller C of the machine tool M starts a process of machining the workpiece W in which the drill is used (step S5 in FIG. 2A).

The measurement data collecting portion 6 collects measurement data from the sensors that are selected by the sensor type selecting portion 5 (step S6 in FIG. 2A). The measurement data analyzing portion 7 analyzes the measurement data that are collected by the measurement data collecting portion 6 (step S7 in FIG. 2A). Then, it is determined whether the determination model JM has been already generated or not (step S8 in FIG. 2B). If the determination model JM has not yet been generated, the analysis data that are analyzed are stored and accumulated in the storage portion 2 (step S9 in FIG. 2B).

Figure 2B:
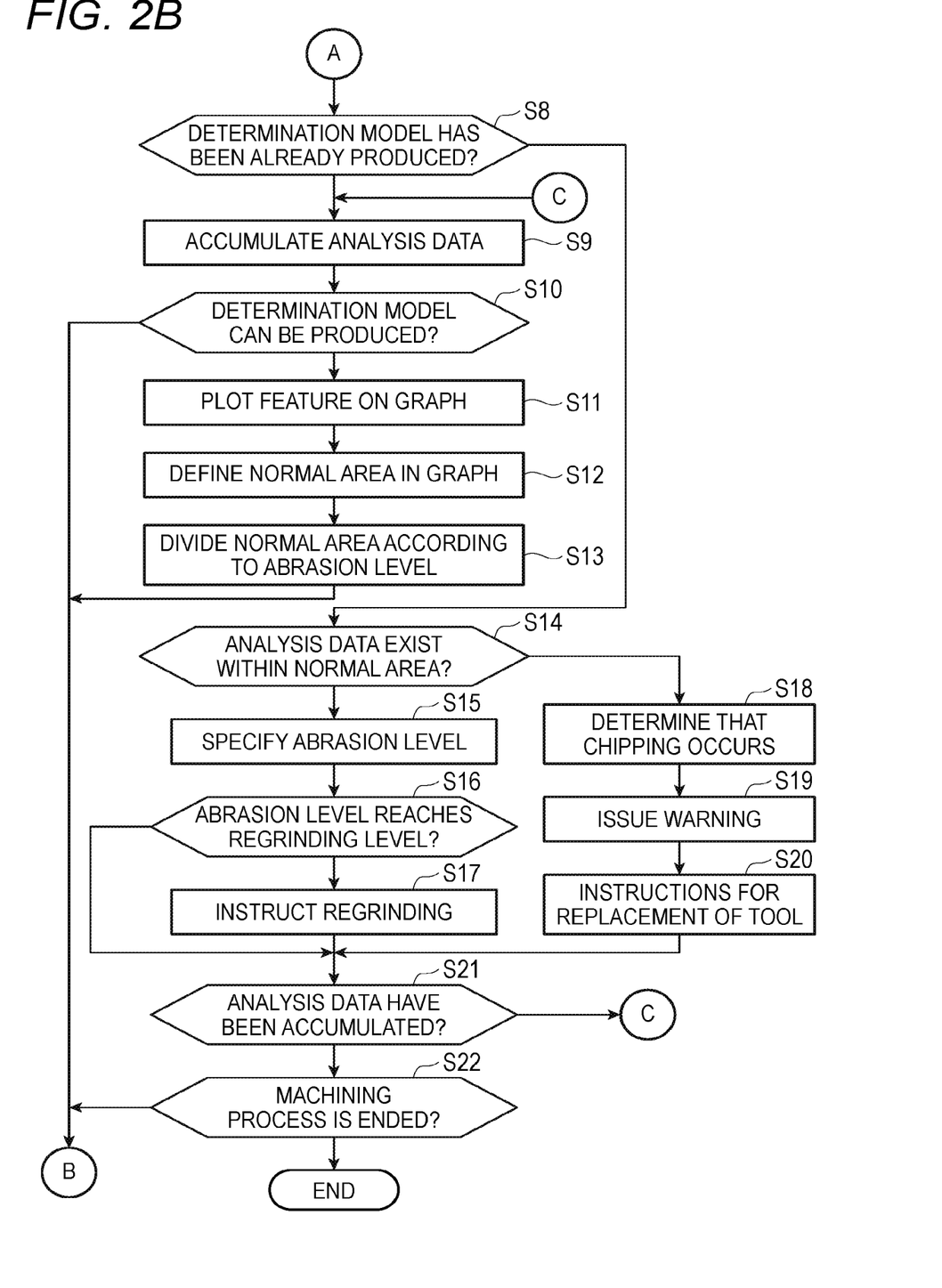
FIG. 2B is a flowchart illustrating the second half of the operation of the abnormality detection apparatus.

Then, the tool condition determining portion 8 determines whether the determination model JM can be generated by using the amount of the analysis data stored in the storage portion 2 or not (step S10 in FIG. 2B). If it is determined that the amount of the analysis data is insufficient, and the determination model JM cannot be generated, the control returns to step S6 to repeat the above-described processes. If the tool condition determining portion 8 determines that the amount of the analysis data is sufficient, and the determination model JM can be generated, a graph of the features is generated, and the features are plotted on the graph (step S11 in FIG. 2B).

Then, the tool condition determining portion 8 reads out the determination result of normal/abnormal, and result of the abrasion evaluation of the working tool T that are stored in the storage portion 2, defines the normal area of the working tool T in the graph (step S12 in FIG. 2B), and divides the normal area of the working tool T in the graph according to the abrasion level of the edge of the working tool T (step S13 in FIG. 2B). Thereafter, the control returns to step S6 to repeat the above-described processes.

If it is determined in step S8 that the determination model JM has been already generated, by contrast, the tool condition determining portion 8 refers to the determination model JM, and determines whether the analysis data that are analyzed in step S7 exist within the normal area or not (step S14 in FIG. 2B). If the analysis data exist within the normal area, the abrasion level of the edge of the working tool T is specified (step S15 in FIG. 2B).

Then, the tool condition determining portion 8 determines whether the abrasion level of the edge of the working tool T reaches the regrinding level or not (step S16 in FIG. 2B). If the abrasion level of the edge of the working tool T reaches the regrinding level of the working tool T, the controller C of the machine tool M is instructed to perform regrinding on the working tool T (step S17 in FIG. 2B).

If it is determined in step S14 that the analysis data exist outside the normal area, by contrast, the tool condition determining portion 8 determines that chipping occurs in the edge of the working tool T (step S18 in FIG. 2B), issues a warning that chipping occurs in the edge of the working tool T, to the controller C of the machine tool M (step S19 in FIG. 2B), and instructs the controller C of the machine tool M to replace the working tool T with another one (step S20 in FIG. 2B).

If it is determined in step S16 that the abrasion level of the edge of the working tool T does not reach the regrinding level, if regrinding of the working tool T is instructed in step S17, or if replacement of the working tool T is instructed in step S20, the tool condition determining portion 8 determines whether analysis data have been accumulated in the storage portion 2 or not (step S21 in FIG. 2B).

If analysis data have not been accumulated in the storage portion 2, the control returns to step S9 to repeat the above-described processes, and, if analysis data have been accumulated in the storage portion 2, it is determined whether the machining process in the machine tool M is ended or not (step S22 in FIG. 2B). If the machining process in the machine tool M is not ended, the control returns to step S6 to repeat the above-described processes, and, if the machining process in the machine tool M is ended, all processes are ended.

(Others)

In the embodiment, the machining load may be calculated from, for example, the torque of the main spindle, and the cutting conditions may be automatically changed within the normal area in accordance with the calculated machining load. When the machining load is small, for example, the cutting conditions are enhanced to improve the productivity, and, when the machining load is large, the cutting conditions are lowered to prolong the life period of the tool.

Although, in the embodiment, the features are associated with the tool condition, the features may be associated with the operational state of the facility, and an abnormality of the facility may be detected.

The abnormality detection apparatus 1 may further include a communicating portion (a wired network or a wireless network). Correlation data can be transmitted from another machine tool, an external server, or an external storage device through the communicating portion disposed in the abnormality detection apparatus 1, and then stored in the storage portion 2 of the abnormality detection apparatus 1. Therefore, correlation data can be shared among machine tools which are similar to one another in type (horizontal machining centers, vertical machining centers, five-axis machining centers, gear skiving centers, or the like) and configuration (the size of the main spindle, etc.), and in which features of a plurality of operating portions are correlated with a working tool condition for each of a plurality of operating portions. Therefore, the learning time can be shortened. Even in the case where features are correlated with the tool condition, but the correlation is not high, data can be shared, and the learning time can be shortened.

DESCRIPTION OF REFERENCE NUMERALS AND SIGNS

1: abnormality detection apparatus for working tool, 2: storage portion, 3: tool type data acquiring portion, 4: feature selecting portion, 5: sensor type selecting portion, 6: measurement data collecting portion, 7: measurement data analyzing portion, 8: tool condition determining portion, M: machine tool, T: working tool, W: workpiece

What is claimed is:

1. An abnormality detection apparatus for working tools configured to be used in a machining process performed by a machine tool, the abnormality detection apparatus comprising:

a storage portion which previously stores correlations between features of a plurality of operating portions relation to the machining process performed by the machine tool, and a tool condition of each of a plurality of working tool types; and a tool condition determining portion which generates a determination model for each of the plurality of working tool types, based on measurement data of the features of the operating portions, and determines the tool condition of the working tools based on the determination model.

2. The abnormality detection apparatus for working tools according to claim 1, wherein the tool condition is abrasion of an edge of a working tool of the working tools.

3. The abnormality detection apparatus for working tools according to claim 1, wherein the tool condition is chipping of an edge a working tool of the working tools.

4. The abnormality detection apparatus for working tools according to claim 1, wherein the abnormality detection apparatus further comprises a sensor selecting portion which selects a predetermined sensor from a plurality of sensors for measuring the features of the operating portions, based on the features which are effective in determination of the tool condition of the working tools, and wherein the tool condition determining portion is configured to determine the tool condition of the working tools, based on the measurement data of the features measured by the selected sensors.

5. The abnormality detection apparatus for working tools according to claim 4, wherein the plurality of sensors include a torque sensor, a vibration sensor, and a position sensor.

6. The abnormality detection apparatus for working tools according to claim 1, wherein the tool condition determining portion defines a normal area indexing that the working tools are normal, based on the determination model, and, when the measurement data of the features are outside the normal area, determines that the working tools are abnormal.

7. The abnormality detection apparatus for working tools according to claim 1, wherein the tool condition determining portion defines a normal area indexing that the working tools are normal, based on the determination model, and determines a level of abrasion of an edge of the working tools, based on positions of the measurement data of the features in the normal area.

8. The abnormality detection apparatus for working tools according to claim 1, wherein the determination model is stored in a determination model storage portion of the machine tool.

9. The abnormality detection apparatus for working tools according to claim 1, wherein the abnormality detection apparatus further comprises a measurement data analyzing portion configured to analyze the measurement data and store analysis data to in the storage portion, each time when measurement data of the features are collected, and wherein the tool condition determining portion is configured to generate the determination model by performing machine learning on a stored analysis data of the features.

10. The abnormality detection apparatus for working tools according to claim 9, wherein the tool condition determining portion is configured to generate the determination model by re-learning data relation to the machining process obtained during the machining process performed by the machine tool.

11. The abnormality detection apparatus for working tools according to claim 1, wherein the plurality of tool types include a drill and a skiving.

\* \* \* \* \*